No. 622,066. Patented Mar. 28, 1899.
J. C. PARKER.
BICYCLE FRAME.
(Application filed Sept. 12, 1898.)
(No Model.)
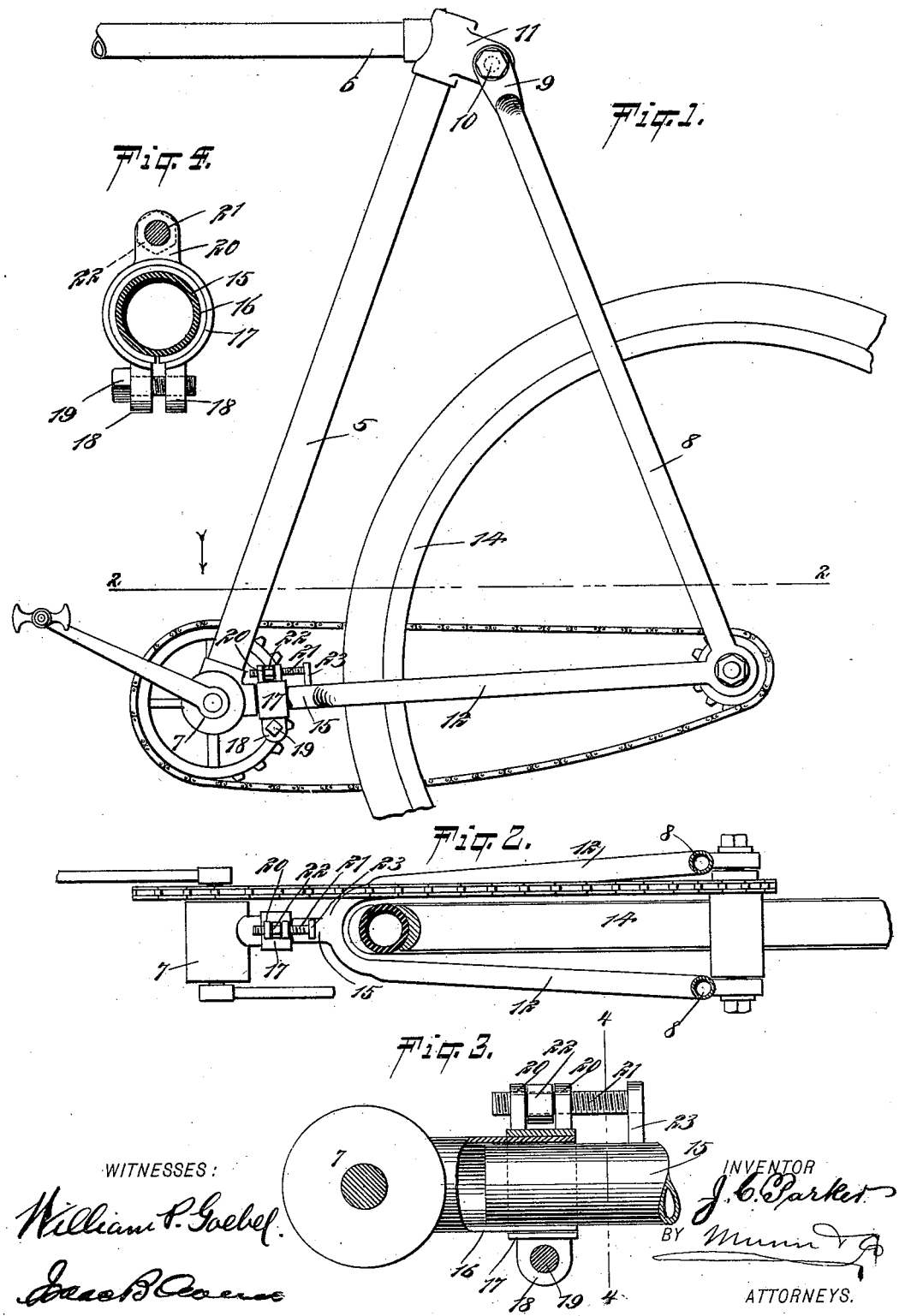
WITNESSES:
William P. Goebel.
INVENTOR
J. C. Parker
BY Munn & Co.
ATTORNEYS.
THE NORRIS PETERS CO., PHOTO-LITHO., WASHINGTON, D. C.

UNITED STATES PATENT OFFICE.

JEREMIAH C PARKER, OF RED BANK, NEW JERSEY.

BICYCLE-FRAME.

SPECIFICATION forming part of Letters Patent No. 622,066, dated March 28, 1899.

Application filed September 12, 1898. Serial No. 690,774. (No model.)

*To all whom it may concern:*

Be it known that I, JEREMIAH CHADWICK PARKER, of Red Bank, in the county of Monmouth and State of New Jersey, have invented a new and Improved Bicycle-Frame, of which the following is a full, clear, and exact description.

This invention relates to a bicycle-frame of that class in which the frame is constructed so that it may be adjusted for regulating the tension of the driving-chain.

This specification is the disclosure of one form of my invention, while the claim defines the actual scope of the invention.

Reference is to be had to the accompanying drawings, forming a part of this specification, in which similar characters of reference indicate corresponding parts in all the figures.

Figure 1 is a fragmentary side elevation of a bicycle to which my improvements are applied. Fig. 2 is a sectional plan view looking downward from the line 2 2 of Fig. 1. Fig. 3 is an elevation of the adjusting devices, with parts in section; and Fig. 4 is a sectional view on the line 4 4 of Fig. 3.

The bicycle-frame has the usual central brace 5 and top brace 6, to the lower end of the former of which is rigidly attached the crank-hanger 7. The two rear upper braces 8 are converged at their upper ends and joined rigidly to each other, such braces terminating in a tongue or tongues 9, pivotally joined by a bolt 10 to an extension 11, projected rearwardly from the upper end of the central brace 5. The lower ends of the rear upper braces 8 are respectively rigidly joined to the rear ends of the rear lower braces 12. This attachment may be effected by any desired means. The rear wheel 14 is mounted in the usual bearings at the junction of the braces 8 and 12. The braces 12 are joined rigidly to each other at their front ends, and from these joined ends a rigid stem 15 projects forwardly. This stem 15 is fitted removably in a split socket-tube 16, rigidly carried on and projecting rearwardly from the crank-hanger 7. Now by sliding the stem 15 longitudinally in the split socket-tube 16 the parts 8 and 12, with the wheel 14, will be moved on the pivot of the bolt 10, thus adjusting the axis of the wheel 14 toward and from the axis of the crank-hanger, and thereby regulating the tension of the sprocket-chain, which is geared as usual.

The stem 15 is held and adjusted in the socket-tube 16 by means of a clamp 17, which is provided with lugs 18, through which is passed a screw 19, the purpose of which is to tighten or relax the grip of the clamp, and consequently contract or relax the split socket-tube 16. By these means the stem 15 is held. The upper portion of the clamp 17 is provided with two longitudinally-alined lugs 20, through which is passed loosely a threaded shaft 21. Working on the shaft 21, between the lugs 20, is a nut 22, the turning of which serves to move the threaded shaft 21 longitudinally on the clamp 17. The shaft 21 is rigidly attached to a lug 23, carried rigidly on the stem 15. To adjust the frame, therefore, the screw 19 should be operated to relax the grip of the clamp 17, and consequently of the socket-tube 16, on the stem 15. Then by the manipulation of the nut 22 the shaft 21, with the stem 15, is moved toward or from the crank-hanger, which is followed by the bodily swinging of the braces 8 and 12 on the bolt 10. It may be seen that the adjustment and disposition of the parts insure the entire rigidity and strength of the frame and also that when the parts are once fastened there is no possibility of their becoming accidentally displaced.

The movement of the braces 8 and 12 toward and from the crank-hanger being always slight, that unevenness of movement which will exist between the split tube 16 and the stem 15 will not materially affect the action of the several parts of the bicycle, especially in view of the fact that the tube 16 is of a resilient nature and may conform to a certain extent with the position of the stem 15, notwithstanding that such position is subject to various changes.

Having thus described my invention, I claim as new and desire to secure by Letters Patent—

In a velocipede, the combination with the central and top braces, of two rear upper braces mounted to swing at the top of the central brace, rear lower braces joined to the rear upper braces and having their front ends joined to each other and formed with a forwardly-projecting stem, a split socket-tube carried rigidly at the lower end of the central brace and receiving the stem, a clamp encircling the socket-tube and having a clamping-screw adapted to contract the clamp so as to fasten it upon the stem, two lugs rigidly attached to the clamp, a lug attached to the stem opposite the clamping-screw, a threaded shaft rigidly attached to the lug of the stem and passed through the lugs on the clamp, and a nut working on the threaded shaft between the lugs of the clamp.

JEREMIAH C. PARKER.

Witnesses:
  WM. CULLINGTON,
  T. H. BRITTON.